United States Patent [19]

Lobb

[11] 4,090,775
[45] May 23, 1978

[54] MOVEABLE OPTICAL PROBE FOR VIEWING A SCALE MODEL WITH IMAGE TILTING

[76] Inventor: Daniel Richard Lobb, 28 Darwin Close, Farnborough, Kent, England

[21] Appl. No.: 592,354

[22] Filed: Jul. 1, 1975

Related U.S. Application Data

[63] Continuation-in-part of Ser. No. 483,386, Jun. 26, 1974, Pat. No. 3,972,584, which is a continuation of Ser. No. 286,969, Sep. 7, 1972, abandoned.

[51] Int. Cl.² ............................................. G02B 17/00
[52] U.S. Cl. ......................................... 350/50; 350/48
[58] Field of Search .................. 350/48, 8, 27, 55, 50, 350/247, 54

[56] References Cited

U.S. PATENT DOCUMENTS

| 2,354,614 | 7/1944 | Reason | 350/181 X |
| 3,639,034 | 2/1972 | La Russa | 350/181 X |
| 3,655,260 | 4/1972 | Bartucci et al. | 350/45 |

*Primary Examiner*—Jon W. Henry
*Attorney, Agent, or Firm*—Larson, Taylor and Hinds

[57] ABSTRACT

An optical arrangement, particularly for ground-based flight simulating apparatus of the type using an optical probe moving over a terrain model to provide a visual display of terrain overflown. In such apparatus, during simulated flight, variation of tilt of the model surface relatively to the probe optical axis gives rise to a primary image also tilted relatively to the probe optical axis. The invention solves the problem of providing an in-focus image on a television camera tube the target of which is fixed orthogonal to the probe axis. The arrangement comprises first and second optical imaging systems, and optical axis deflecting means therebetween, usually lens, prism or mirror elements, producing a tilt of the in-focus image plane of the overall system, to compensate for the primary image tilt. The optical arrangement may equally be applied to a laser beam scanned terrain model.

10 Claims, 7 Drawing Figures

MOVEABLE OPTICAL PROBE FOR VIEWING A SCALE MODEL WITH IMAGE TILTING

This application is a continuation-in-part of U.S. application Ser. No. 483,386, filed on June 26, 1974, now U.S. Pat. No. 3,972,584 which, in turn, is a continuation of U.S. application Ser. No. 286,969, filed on Sept. 7, 1972 now abandoned.

BACKGROUND OF THE INVENTION

This invention relates to optical systems for use where an optical image is to be formed of an object surface which may not be normal to the optical axis of the imaging system, enabling the image to be well focused over the full image area, on a surface which is normal to the optical axis of the imaging system, and the invention relates more generally to optical systems in which the tilt of an in-focus image surface, with respect to an axis of the system is to be altered or adjusted.

In many optical imaging applications it is necessary to form an image of a surface which is not normal to the axis of the optics. In photography, for example, a camera is frequently held with its lens axis horizontal and a picture is taken of a horizontal surface such as a road or a table top. In a camera, as in most image forming instruments, the surface on which the final image is required, in this case the film plane, is normal to the optical axis. However, if an object surface is tilted with respect of the normal to the optical axis, then the corresponding image surface at which an in-focus image is formed is also tilted with respect to the normal to the optical axis. According to the Scheimpflug rule, the planes including the axial portions of object surface and image surface respectively, if extended, will intersect at the plane including the imaging lens. It follows that, when an image of a nonnormal surface is formed, the image is generally out-of-focus on the required image surface, except for a narrow band where the tilted, in-focus image plane intersects with the required image surface.

In practice, optical systems have a certain depth of focus which, in relation to an image surface, may be defined as that volume which is bounded by two surfaces, one on each side of the in-focus surface, within which the extent of image defocus is acceptable. In most photographic and other image forming optical systems, it is generally possible to arrange that in-focus image surfaces, albeit tilted with respect to the film plane or other surface on which an image is required, lie within the depth of focus of the systems.

In some cases, however, it is desirable to optimise focus over a large image area by compensating for the in-focus image surface tilt due to a non-normal object surface. It is common practice in such cases to introduce a tilt, either of the surface on which a final image is required, for example the film plane, or of the lens. The tilt in either case is calculated, using the Scheimpflug rule, so that the in-focus image surface coincides with the surface on which the image is required.

We have so far considered optical systems, such as cameras, in which a final image is preferably to be formed on a surface orthogonal to the optical axis. In such cases it is desirable to compensate for tilt of object surfaces. In some optical systems it is necessary to form an image on a surface which is not orthogonal to the optical axis of the projection optics, although it will generally be convenient for the corresponding object surface to be orthogonal or nearly orthogonal to the optical axis. In such optical systems, it is generally desirable to produce tilt in the in-focus image surface to match the tilt of the surface upon which the image is to be projected.

Any optical arrangement which may be used to compensate for tilt in an object surface may alternatively be used to produce tilt in an in-focus image surface. The positions of object surface and in-focus image surface may simply be reversed. Thus, in a slide projector system in which an image is required to be projected onto a screen not orthogonal to the radiation propagation direction, the focus of the image on the screen may be optimised by tilting the projector lens by an angle calculated according to the Scheimpflug rule.

In some optical systems, very large tilts appear in in-focus image surfaces, so that it becomes difficult, using available components, to compensate for the tilt by the classical method of tilting elements in the optical system. The present invention may be used in such optical systems.

Also, in some optical systems, it is necessary to accommodate very large tilts in the surface on which a final image is required so that it is difficult, using available components, to produce the required tilt by the classical method. The present invention may be used in optical systems in which either a large tilt of an object surface must be compensated or a large tilt must be produced in an in-focus image surface. It is to be particularly noted that the same devices may be used either for tilt compensation or for tilt production.

The invention has a specific use in visual simulation systems, such as are used for example in ground-based, flight simulating apparatus. In such systems, it is common practice to use a model of the terrain to be flown over in simulated flight and to relay an image of the terrain to the trainee crew via a closed circuit television system. An image of the model is first formed onto a television camera target by an optical arrangement known as a probe. The present invention is applied in such probe optics. The entrance pupil of the probe optics is manoeuvred above the model terrain so that the picture relayed to the trainee crew is continuously in the required perspective. To achieve correct perspective, the separation of the probe entrance pupil from the model must be proportional to the simulated aircraft height, in the proportion of the model to real terrain scale ratio.

In a practical flight simulator system, a minimum separation between the probe entrance pupil and the model surface, simulating an aircraft position on a runway, may be only about 2 mm. It is necessary that the entrance pupil diameter of a practical probe should be at least about 0.5 mm in order for the probe to collect sufficient light, and also in order to give an acceptable diffraction limit on probe optical resolution. Since it is difficult to design well-corrected lenses with high numerical apertures, that is large ratio of pupil size to focal length, the focal length of probe optics can in practice be no less than a few millimeters, a reasonable minimum being about 3 mm.

Model surfaces may be regarded as flat and, with a simulated aircraft positioned on a runway, the probe optical axis is effectively parallel to the model surface in most simulator systems. Applying the Scheimpflug rule, and assuming the minimum entrance pupil to model separation and the focal length estimated above, the calculated tilt of the primary in-focus image plane with respect to the normal to the optical axis, is 56°.

In a simulator system, an image plane tilt of this order cannot readily be compensated either by tilting the television camera target with respect to the probe optics, or by tilting a lens in the probe optics.

Tilting of the target surface is not mechanically feasible in simulator systems, and would introduce excessive image distortion.

Probe systems have been constructed in which tiltable lenses are used, according to known methods, to provide a measure of compensation for tilt of the primary in-focus image plane. To be effective in compensating for primary image tilt, a tiltable lens must have some dioptric power, that is, power to converge or diverge light beams, and it must be set in a position in the optical system where it has an appreciable converging or diverging effect on beams associated with field-of-view image points, that is, it must not be a field lens set at an image plane. Typically, a single tiltable lens may follow the objective lens of a probe, collimating light received from the primary image formed by the objective. As the primary image tilts, the tiltable lens is tilted through the same angle, so that the primary image remains in the focal plane of the tiltable lens. Thus, light from the whole primary image area is always collimated.

More complex probe systems have been constructed in which more than one lens is tilted, the function of compensating for primary image tilt being effectively divided between the tilting lenses.

In optical systems in which lenses are tilted to compensate tilt of object or primary image surfaces, including complex systems such as simulator probes, it has been common practice for each tilted lens to be rotated about a tilt axis in the region of the lens itself.

Commonly a lens is tilted about a nodal point, in order to avoid movement of the transmitted image due to the lens rotation. In existing systems, tiltable lenses having large field angles but only moderate numerical apertures are used. It is therefore necessary for each tilt lens to be rotated about a tilt axis not far removed from the lens entrance pupil, since large lateral movement of the lens pupil would cause unacceptable vignetting. In no known tilt lens system for compensating primary image tilt, is a tiltable lens rotated about an axis of rotation in or near a neighbouring image plane.

Since, in existing systems, each tiltable lens is tilted about an axis in the region of the lens itself, as a lens is tilted through an angle $\theta$, the centre of the image to be relayed by the lens moves to a part of the angular field of the lens which is approximately $\theta$ off the lens axis. To preserve good resolution in the relayed image, the tiltable lens must be corrected for image aberrations over a semifield angle approximately equal to, or somewhat in excess of, the maximum angle $\theta$ through which the lens is to be tilted. Where comparatively small lens tilt angles are required, as in most photographic applications, the off-axis correction of tilted lenses is generally adequate. However, where large lens tilt angle are required, as in simulator probes, it has been found difficult to provide adequate correction for optical aberrations of the tiltable lenses over their necessarily large field angles, even when more than one tiltable lens is employed to divide the tilt angle to be introduced at each. Thus, existing simulator probes have not provided well-resolved images for the smallest required separations of the probe entrance pupil from the model.

The invention may also be used in visual flight simulation systems as described above, but in which the probe is replaced by a laser beam scanning system which projects a moving beam on to the model terrain and in which laser light reflected from the model terrain is collected on photo-detectors. The photo-detector output signals provide a video signal similar to that which would be provided by a television camera in a probe. In order for the video signal to provide a picture in correct perspective, it is necessary for the exit pupil of the laser beam scanner, that is, the aperture from which the beam is scanned, to be manoeuvred above the model terrain in the same way as the entrance pupil of a probe. The separation of the exit pupil from the model surface must be proportional to the simulated aircraft height in the proportion of model to real terrain scale ratio.

In a practical system, the minimum separation of the laser scanner exit pupil from the model surface may be only about 2 mm. The laser beam width at the exit pupil must be at least about 0.5 mm for at least part of the scan, in order to give an acceptable diffraction limit on the angular resolution of the scan. It is desirable that the laser beam should be continuously in focus on the model surface, even though the surface is at an acute angle to the radiation propagation direction. Beam deflecting devices such as may be used in the laser beam scanning system cannot readily be made to alter the beam convergence or divergence angle as the beam is deflected. If the device scans the beam so that it is in focus in a line or plane, then the line or plane must generally be substantially orthogonal to the radiation propagation direction.

The laser beam scanning system must therefore preferably include an optical system capable of producing a tilt, with respect to the orthogonal to the optical axis or radiation propagation direction, in the surface on which the laser beam reaches its focus. The optical system will be set between the scanning device and the exit pupil. The system will receive light from a real or virtual "object" surface orthogonal to the beam direction, on which the beam is in focus, and form an image of this object surface on an image surface which is generally tilted with respect to the orthogonal to the beam direction.

The problem of producing image surface tilt in a laser beam scanning system is essentially similar to the problem of compensating for object surface tilt in a probe. The same optical systems may in principle be used in the two cases, with object and image surfaces being interchanged in the two cases. The final lens in the laser beam scanning system, which takes the place of the front lens of a probe, may, with a 0.5 mm external pupil, have a minimum focal length of about 3 mm. When the pupil is only 2 mm from the model surface, if the laser beam is to be focussed on the model surface, then the laser beam must also be in focus as it scans along a line or in a plane tilted at about 56° to the back focal plane of the final lens. This is the tilt angle to be produced by a tilt compensation optical system.

One or more tilted relay lenses may be employed in a laser beam scanning system, set between the beam deflecting device and the final lens before the exit pupil. But as in the case of the probe, a tilt angle of order 56° cannot readily be dealt with using available lenses as tilting lenses in a conventional configuration.

One object of the present invention is to provide means for correcting large tilts of an in-focus image surface, so that a final image may be formed on a surface substantially normal to the radiation propagation direction, which is in good focus over the whole image area.

Another object of the invention is to provide means for producing tilt in an in-focus image plane, for example, as required in a laser beam scanning system.

BRIEF DESCRIPTION OF THE DRAWINGS

In order that the invention may readily be carried into practice, a number of practical embodiments will now be described in detail, by way of example, with reference to the accompanying drawings, in which.

DETAILED DESCRIPTION

Figure 1:
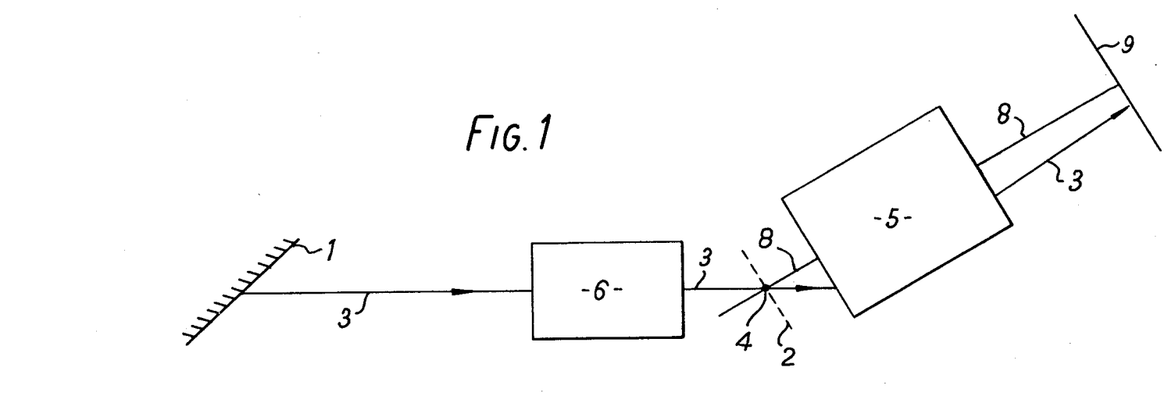
FIG. 1 is a diagram explaining the principle of the invention and showing an optical system having first and second imaging systems, the second with its axis inclined to the axis of the first.

An optical arrangement which explains the principle of the invention is shown diagrammatically in FIG. 1. In FIG. 1, a first optical imaging lens system 6 forms an image of an object surface 1, the image being substantially in focus on an image surface 2. The object surface 1 is tilted with respect to the optical axis 3 of the lens system 6. The image surface 2 is consequently tilted with respect to the optical axis 3. The axial area of the image surface 2 intersects the optical axis 3 in the line 4, which is perpendicular to the plane of the diagram.

Light from the image at surface 2 is collected by a second optical imaging lens system 5, whose optical axis 8 intersects the optical axis 3 and the line 4. Lens 5 is mounted so that its optical axis 8 is rotatable about the line 4, as axis.

Lens 5 is rotated, as shown in FIG. 1, to a position which brings the image surface 2 normal to the optical axis 8 of lens 5. Thus, the further image produced by lens 5 of the image at surface 2 lies in a plane normal to the optical axis 8, as shown by the plane 9.

In arrangements exemplified by the system shown in FIG. 1, it is necessary for one or both of the optical systems 5 and 6 to have a large relative aperture. This is necessary in order that radiation deflection, with respect to the axis 8, due to tilt of the second optical system 5, does not prevent much of the radiation from being collected by the optical system 5.

In FIG. 1, the second optical system 5, is shown diagrammatically with a large collection aperture.

It is to be particularly noted, in the arrangement of FIG. 1, that variable inclination of the object surface 1 with respect to the axis 3 results in correspondingly variable inclination of the primary image surface 2, with respect to the axis 3. The arrangement of FIG. 1 solves the problem of relaying the primary image (2) onto an image surface 9 which is fixed and orthogonal to the optical axis 8. However, this is achieved by variably rotating the imaging system 5 and the image surface 9 together. Because the image surface 9 may be the target surface of a television camera tube, this solution is not expedient in practical apparatus. The invention solves the further problem of providing a fully in-focus relayed image on an image surface fixed orthogonal to the axis of the second imaging system, without moving the final image surface itself. This solution requires additional means in order to deflect one or both optical axes 3 and 8 adjustable to achieve the required end result.

Figure 2:
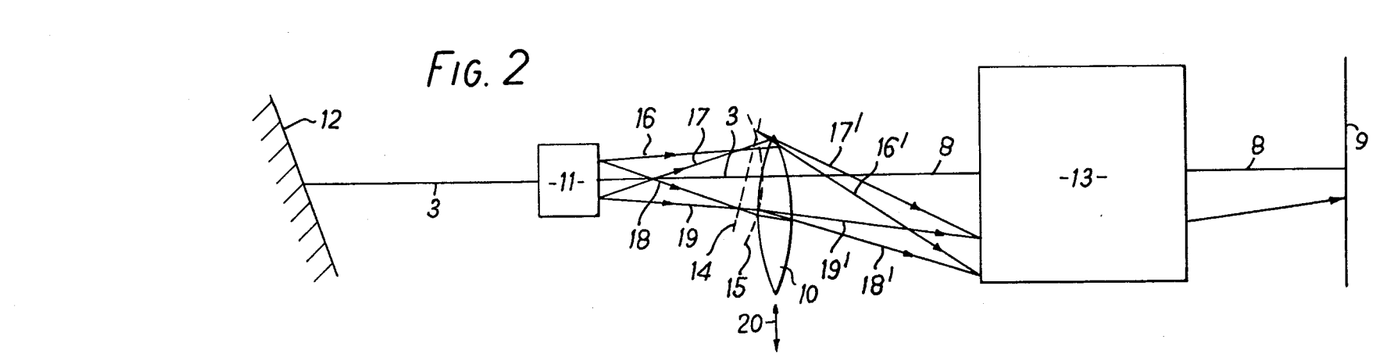
FIG. 2 is a diagram showing an optical system having first and second imaging systems, with an intermediate lens.

FIG. 2 shows an arrangement in which the first and second imaging systems are fixed, with a common axis, but have a movable optical element between them.

Any simple optical element, whether reflecting or refracting, which deflects radiation from its initial direction, also alters the tilt of any image surface associated with the radiation.

If a reflecting surface deflects a beam of radiation through an angle A, then an image surface associated with the beam is tilted through an angle A, (neglecting any image aberrations introduced by the surface).

If a refracting wedge, which may be a part of a lens, deflects a beam through an angle B, then an image surface associated with the beam is tilted through an angle $-B/n$, (again neglecting aberrations), where $n$ is the refractive index of the wedge.

A second form of the invention includes an optical element, a refracting element or a reflecting element which is movable with respect to the first and second optical imaging systems. The optical axes of the first and second optical imaging systems are fixed with respect to each other.

Such an arrangement is illustrated in FIG. 2, wherein the optical systems are fixed and lie on a common axis and wherein the optical element is a converging glass lens.

In FIG. 2, a first optical imaging lens system 11, forms an image of an object surface 12, close to the lens system 10. The object surface 12 is, in this example, a model terrain forming part of a ground-based flight simulator visual display. Light transmitted through lens system 10 is collected by the second optical imaging lens system 13, to form a further image on a plane 9.

The object surface 12, is tilted with respect to the axis 3 of the lens system 11, so that the primary image formed by lens 11 lies on a tilted first image surface, indicated by the dotted line 14. The lens system 13 has its axis 8 in line with the axis 3.

The lens 10 deflects the light associated with the image (14) through a mean angle adjusted to be 1.5 times the tilt of the primary image surface 14. The refractive index of the lens 10 is 1.5, so that the second image surface, indicated by the dotted line 15, defining the surface at which the image appears from the second optical imaging lens system 13, is untilted with respect to the optical axis 8 of lens 13.

Paths of rays to a primary image point are indicated by lines 16 and 17. Paths of the same rays after deflection at lens 10 are indicated by lines 16' and 17'. These lines are projected rearwards to an intersection to indicate the position of the image point on the surface 15, as it appears from lens system 13. Similarly, lines 18 and 19 indicate ray paths to another primary image point. The same rays, after deflection at lens 10, are indicated by lines 18' and 19'.

The deflection of light produced by lens 10, and hence the image surface tilt it produces, may be adjusted by shifting lens 10 laterally, substantially in its own plane, as shown by arrows 20. When lens 10 is coaxial with lens system 11 and 13, on axis 3 – 8, no mean deflection of light is introduced and there is no image tilt correction. The image tilt introduced by lens 10 is approximately proportional to the lateral separation of its axis from the axis 3 – 8 of the lens systems 11 and 13. The image of the field of view, relayed on plane 9 by lens system 13, may therefore be corrected for tilt with respect to the axis 8 of lens system 13, for a range of tilts of the primary image (14).

Figures 3, 4:
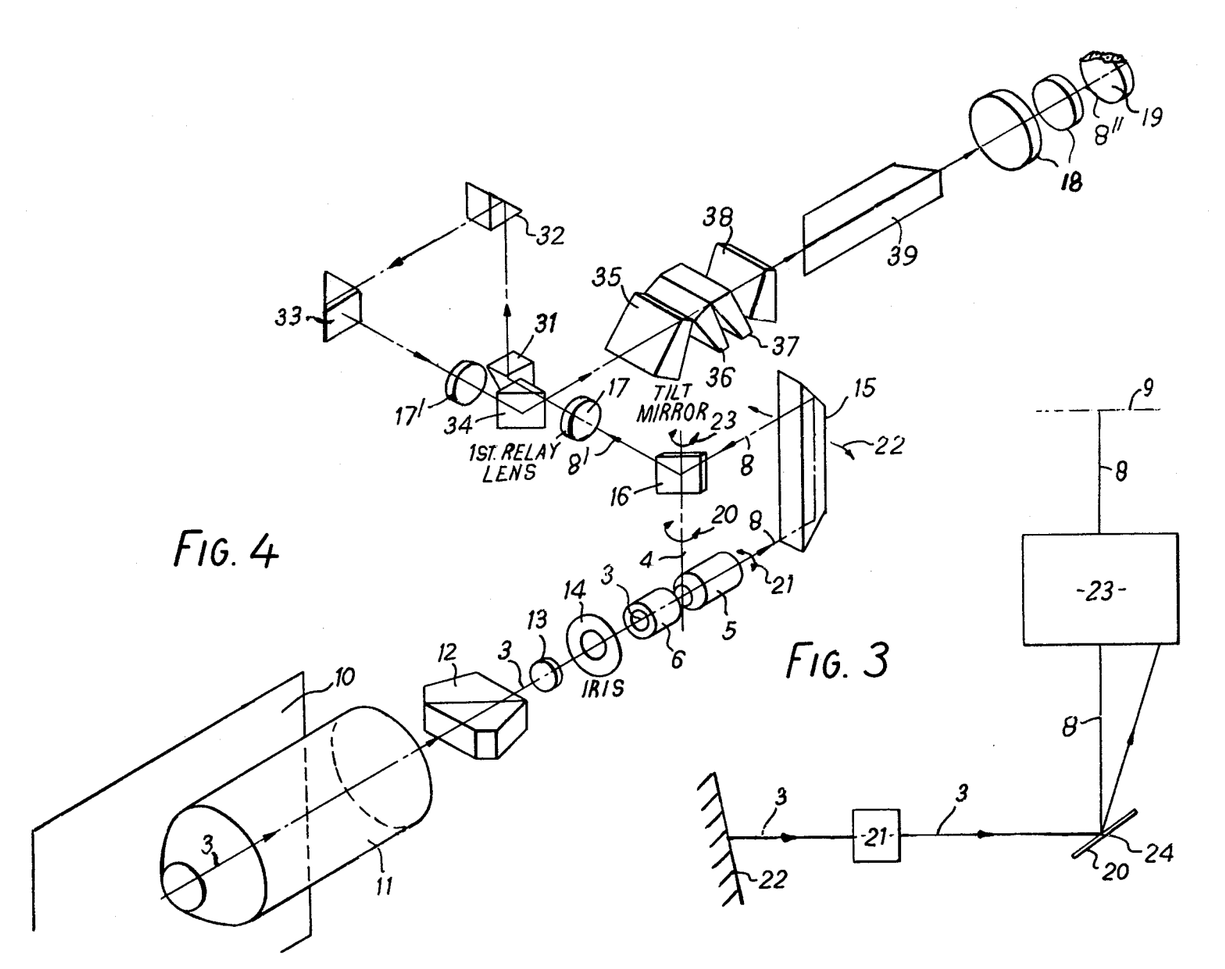
FIG. 3 is a diagram showing an optical system similar to that of FIG. 1, with an intermediate mirror.
FIG. 4 is a perspective diagram showing the optical components of an optical probe.

A further arrangement according to the invention is illustrated in FIG. 3, wherein the axes 3 and 8 of the two optical imaging lens systems 21 and 23, respectively, are perpendicular and, between the two lens systems 21 and 23 is a flat front-surface silvered mirror 20. In this arrangement, lens system 21 forms an image of an object surface 22 close to the mirror 20. The second lens system 23 collects light reflected from the mirror 20 to form a further image on a plane 9. The optical axes 3 and 8 intersect at a point 24 on the surface of the mirror 20.

The normal to the mirror at point 24 has a nominal direction bisecting the angle between axes 3 and 8 of the lens systems 21 and 23. With the mirror 20 normal in this nominal position, the mirror deflects light through a mean angle of 90°, also tilting the image plane associated with the light through 90° so that, if the primary image surface formed by lens system 21 is normal to the axis 3 of lens system 21, that image surface will appear from lens system 23 to be normal to the axis 8 of lens system 23. If the primary image has a tilt with respect to the axis 3 of lens system 21, the mirror is pivoted about point 24 away from its nominal orientation, through an angle equal to half the tilt correction required and in the same sense. This mirror tilt alters the light deflection by an angle equal to the required tilt correction, and also tilts the image, as it appears from lens system 23, through the required angle. Thus, an adjustment in orientation of the flat mirror 20 can be used to bring the image, as relayed on by lens system 23, parallel to the normal to the axis 8 of lens 23, for a range of primary image tilts.

Other simple refracting or reflecting optical elements can be used as the optical element introducing image tilt correction. For example, a reflecting prism may be used instead of the mirror 20 in a system otherwise similar to that shown in FIG. 3. A refracting wedge of glass may be used in place of the lens 10 shown in FIG. 2. A fixed refracting wedge introduces an image tilt of constant amplitude, but rotation of the wedge in its own plane produces a rotation of the axis of the tilt introduced. Two refracting wedges, independently rotatable in their own planes, and of equal prismatic power, could be used to introduce a range of image tilt amplitude and also a range of image tilt axis directions.

Some image aberrations are introduced by all the simple optical devices described above, except the flat mirror 20 of FIG. 3. These aberrations may be corrected by use of compound components rather than single elements. Thus, for example, a doublet or triplet lens system may be used instead of the single lens 10 shown in FIG. 2. Groups of refracting wedges may similarly be used, instead of single refracting wedge in the alternative to FIG. 2, mentioned above.

Simple refracting or reflecting optical devices, as opposed to optical devices using both refraction and reflection, produce mean deflections of beams which are generally not smaller than the tilt angles which they introduce in images associated with the beams. When a fixed image tilt is required to be introduced, the optical device introduces a fixed beam deflection, and it is possible to arrange that the optical axis of each of the optical imaging lens systems is centred on the beam passing through it. Thus, neither lens system need have an aperture enlarged to accommodate the beam deflection introduced by the optical device. If the axes of both lens systems are centred on the beam, however, the optical device may not be a purely reflecting component, since a reflecting surface does not alter image tilt with respect to beam propagation direction.

When a range of image tilt is required to be introduced, a refracting optical device or a reflecting optical device generally produces a range of beam deflections, so that if, as in the first embodiment, the optical axes of the first and second optical imaging systems are fixed with respect to each other, then one or both of the optical imaging systems must have an aperture enlarged to accommodate the range of beam deflections. Thus, in the arrangements shown in FIGS. 2 and 3, each second optical imaging system, that is lens system 13 of FIG. 2 and lens system 23 of FIG. 3, is given a large aperture in order that it may always collect the deflected beam emerging from the optical device. In such arrangements, the range of beam deflections, and hence the range of image tilt, which can be introduced is limited by the numerical apertures of practical, well-corrected optical imaging systems.

FIG. 4 is a perspective diagram showing the optical elements of an optical probe which embodies the tilt compensating arrangement of FIG. 1. The elements included in FIG. 4 are indicated by the same reference numerals as used in FIG. 1.

In FIG. 4, a wide angle front lens 11, having an optical axis 3, views the object surface 10 of a terrain model. The lens 11 is shown with its axis 3 lying parallel to the plane of surface 10, as for viewing the terrain model in level flight.

In a practical arrangement of a terrain model and viewing probe, the lens 11 would be mounted with its axis 3 perpendicular to the plane 10 and the lens 11 would view the model by way of a pitch prism, not shown.

Also arranged with the common optical axis 3, in sequence following the front lens 11, are a Pechan prism 12, a tube length corrector 13, an iris 14, and the first lens 6 of the arrangement of FIG. 1.

The front lens 11 views the object surface 10 and forms a primary image, the surface of which is inclined to the optical axis 3. The lens 6 views this primary image and forms an image the surface of which is also inclined to the optical axis 3 and includes the line 4.

As explained with reference to FIG. 1, lens 5 views the tilted image formed by lens 6 and, in order to bring the tilted image into the plane normal to optical axis 8, the lens 5 is rotated about line 4 as rotation axis, the optical axis 8 being rotated about the line 4, as shown by the arrows 20 and 21.

Figure 5:
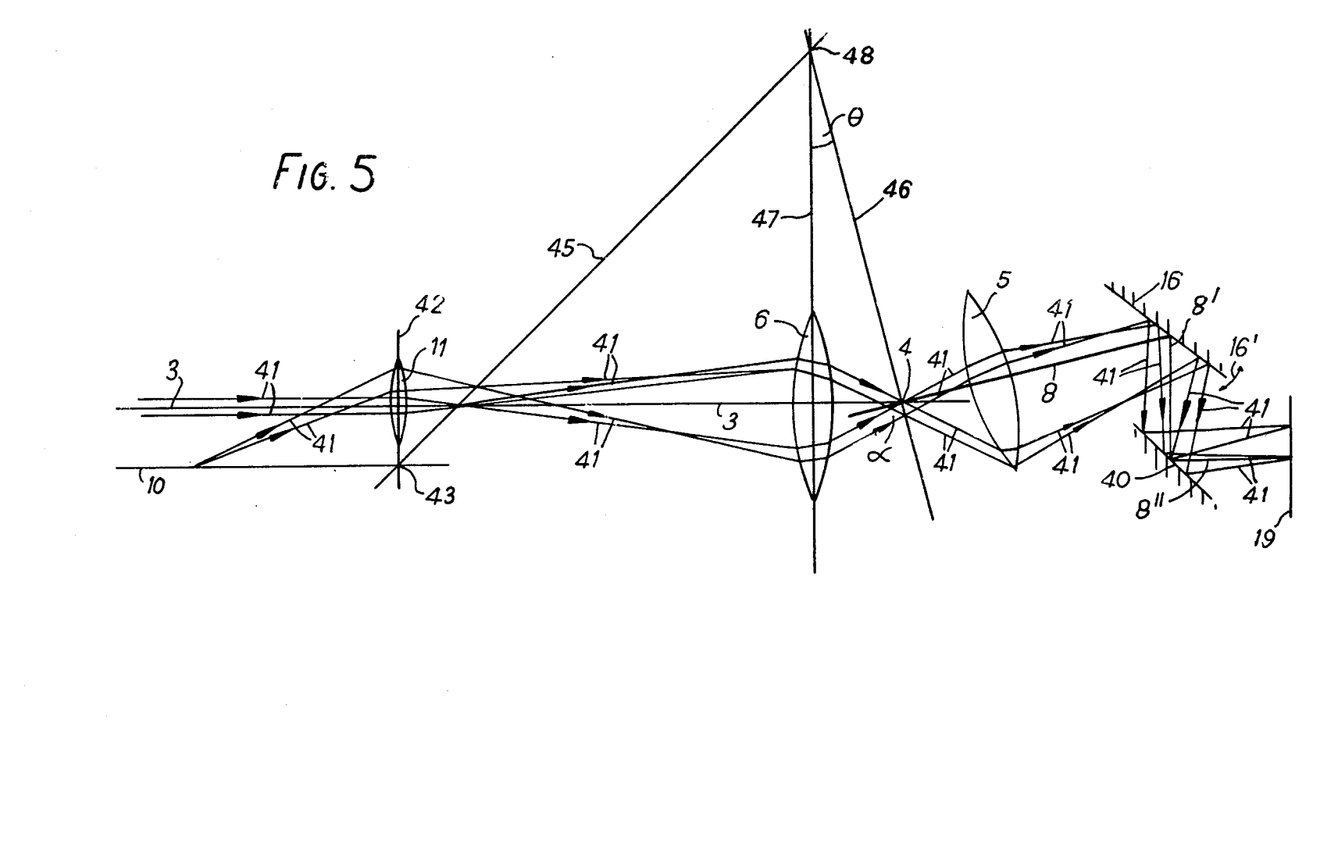
FIG. 5 is a diagram showing the manner of operation of the optical probe of FIG. 4.

It will be noted that whereas in FIG. 1 the line 4 is perpendicular to the diagram and is thus there represented by a point, the line 4 is represented by a line in FIG. 4. In FIG. 5 later to be described, the line 4 is again perpendicular to the diagram.

Referring again to FIG. 4, the lens 5 is followed by a 180° prism 15 the purpose of which is to fold the optical axis 8 so that it again intersects line 4, but at a point 8/4 displaced along line 4 from the point ⅜, where line 4 is intersected by axis 3.

Thus prism 15 is rotated about line 4 with the lens 5, as is indicated by the arrows 22. A mirror 16 is located with its reflecting surface at the point 8/4 and is also rotated about line 4 as rotation axis, as is indicated by the arrows 23, but at one half the angular rotation of lens 5, axis 8 and prism 15. In consequence, the rotating axis 8 is brought back to a fixed axis 8'.

Between the mirror 16 and the target surface 19 of the camera tube are arranged, in succession, a relay lens 17, four fold prisms 31, 32, 33 and 34, a relay lens 17' positioned before the fourth fold prism 34, four image vertical-compression prisms 35, 36, 37 and 38, a roll prism 39 and the television camera lens assembly 18, which relays the image onto the camera tube target 19.

The Pechan prism 12, tube length corrector 13, iris 14, 180° prism 15, relay lenses 17 and 17', fold prisms 31 to 34, vertical compression prisms 35 to 38 and roll prisms 39 are required for functioning of a practical probe of the form described, but form accessory elements of the present invention in its simplest form.

The function of these elements will be briefly described. In any aircraft motion involving roll, the viewed horizon is tilted. The tilt-correction means provided compensates for tilt of the image formed between lenses 5 and 6, with level horizon. The Pechan prism 12 is rotated on axis 3 to counter-rotate the horizon rotation seen by lens 11, and thereby to provide an image with horizon always level. The simulated rotation of horizon is restored by the roll prism 39. Following mirror 16, the optical axis 8' lies in a plane perpendicular to axis 3. Relay lenses 17 and 17' and fold prisms 31 to 34 provide optical means for bringing the emergent optical axis 8" into a line parallel to axis 3. Vertical compression prisms 35 to 38 reduce the image vertical height (related to a level horizon) relatively to the image horizontal width. The effect is to lower the apparent viewing eye-level, which is of value particularly during on-runway simulation.

The function of the optical elements essential to the present invention will be more fully described with reference to FIG. 5.

In FIG. 5, optical elements are similarly referenced as in FIGS. 1 and 2a, 2b. A tilt prism is omitted, as in the other figures. The elements 12, 13, 14, 17, 17', 31 to 34, 35 to 38 and 39, described above are omitted for simplicity. The prism 15 is omitted, the mirror 16 is displaceable as well as rotatable and a mirror 40 is added, so that a diagram drawn in a single plane will suffice for description.

In FIG. 5, the front lens 11, on axis 3, views the object surface 10 and provides a primary image in plane 45. According to the Scheimpflug rule, plane 10, plane 45 and the plane 42 of lens 11 intersect at a common line 43. The lens 6 views the primary image in plane 45 and forms an image in plane 46. According to the Scheimpflug rule, plane 45, plane 46 and the plane 47 of lens 6 intersect at a common line 48. The image plane 46 is clearly tilted with respect to the optical axis 3 of lens 6. The optical axes 3 and 8 are drawn and rays from the terrain model horizon and from the terrain model surface 10 are shown at 41, throughout the diagram. The positions of the real images are shown by the intersection of rays 41 in planes 45 and 46.

Lens 5 is positioned so that its axis 8 is perpendicular to image plane 46. The axis 8 is extended at 8' and 8" and it will be seen that the target surface 19 is perpendicular to axis part 8".

It will readily be seen by inspection of the left-hand part of FIG. 5 that if the aircraft simulated altitude changes, represented by change of height of axis 3 above surface 10, the line 43 of intersection of planes 10 and 42 moves. In consequence the tilt of plane 45 varies. Also, if aircraft simulated pitch varies, for climb or descent, represented by inclination of axis 3, the line 43 of intersection of planes 10 and 42 varies and the tilt of plane 45 varies accordingly.

As the tilt of plane 45 varies, so the line 48 of intersection of plane 45 and lens plane 47 moves. The tilt of image plane 46 varies accordingly.

To bring lens 45 axially perpendicular to variably tilting plane 46, lens 5, and axis 8, are rotated about line 4, which is the line perpendicular to the diagram through the point where axis 3, axis 8 and plane 46 intersect.

For practical convenience, camera tube target surface 19 is fixed and so, therefore, must be axis portion 8".

In FIG. 5, which is diagrammatically simpler, but mechanically more complex, than the arrangement of FIG. 4, mirror 16 is rotated through one half the angle of rotation of axis 8, and also is displaced in the plane of the diagram as shown by arrows 16' so that, for all positions of rotation of axis 8, the reflected axis 8' strikes always the same point on mirror 40 as does the axis 8" of target surface 19.

The moving elements of the optical probe of FIG. 4 are moved by servo motors, not shown, controlled from the associated flight simulator flight computer in a manner which follows established practice and with which the present invention is not concerned.

The optical probe of FIG. 4 accordingly functions, with varying aircraft simulated manoeuvres, to provide an image always well-focussed over its whole area upon the target surface 19 and an image which is relatively better-focussed for close runway objects or marking, for simulated on-runway conditions, than is achieved with known optical probes.

Figure 6:
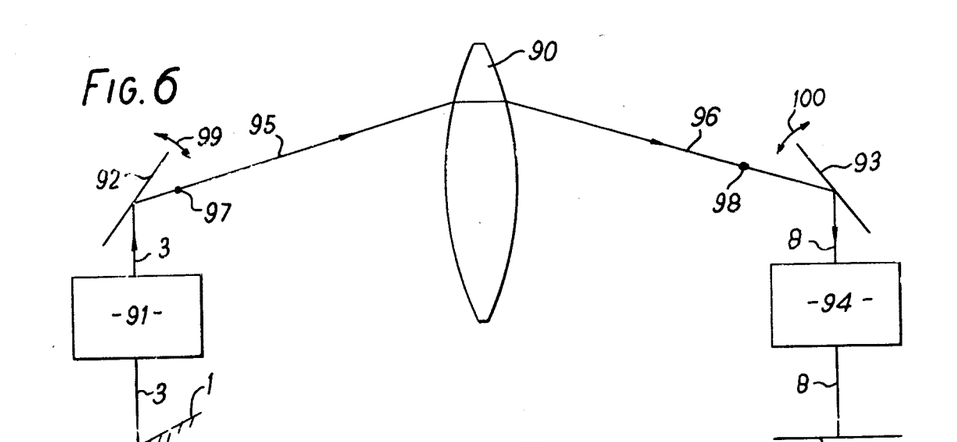
FIG. 6 is a diagram showing an optical system having first and second imaging systems with an intermediate lens and a pair of intermediate tiltable mirrors.

FIG. 6 shows a further arrangement according to the invention, in which the two optical imaging lens systems are fixed relatively to each other. An intermediate lens also is fixed, not laterally displaced as in the arrangement of FIG. 2, and adjustment of the system is provided by a pair of oppositely rotatable plane mirrors.

In FIG. 6, the first lens system 91 has its axis 3 inclined to an object surface 1. The second lens system 94 has its axis 8 fixed in relation to axis 3 and parallel thereto. The final image plane 9 is orthogonal to the axis 8. In a plane parallel to the axes 3 and 8 is positioned a simple convex lens 90. The axes 3 and 8 are correspondingly deflected by flat mirrors 92 and 93, respectively, to intersect the faces of lens 90 at corresponding points, as shown in FIG. 6 by the lines 95 and 96, respectively. To this end, mirrors 92 and 93 are correspondingly and oppositely tiltable, as shown by the arrows 99 and 100, respectively.

Thus, in FIG. 6, lens system 91 forms a primary image of the object surface 1 at an image surface at lens 90, similar to surface 14 shown in FIG. 2.

The function of lens 90, FIG. 6, is the same as that of lens 10, FIG. 2. Instead of the lens being laterally displaceable relatively to fixed optical axes 3 and 8, however, the optical axes 95 and 96, respectively, are displaced relatively to the fixed lens 90, by equal and opposite rotation of mirrors 92 and 93, respectively.

As the mirrors 92 and 93 are tilted, the optical axes 95 and 96, respectively, appear to rotate about points 97 and 98, respectively. The lens 90 focuses an image of point 97 onto point 98, so that the altering beam deflection introduced by the field lens 90 always equals the angle between the optical axes. Thus, if the beam emerging from lens system 91, and forming an image at lens 90, is centred on the optical axis 3 of the lens system 91, the beam after deflection at the lens 90 is centred on the optical axis 96 of the optical lens system 94.

In the detailed description above, with reference to FIGS. 1 to 6, it is assumed, for simplicity, that the function of each arrangement is to compensate for tilt of the object surface, so that the final image may be formed on a target surface substantially normal to the axis of the relay lens system.

Each one of the arrangements described above may, alternatively, be used to introduce a fixed tilt, or an adjustable tilt, of an in-focus image surface, if that is required. For example, as shown in the diagram FIG. 7, an arrangement according to the invention may be used in an optical system, in which an object surface is normal to the light propagation direction, to enable an in-focus image to be formed on a surface inclined at an angle to the light direction.

Figure 7:
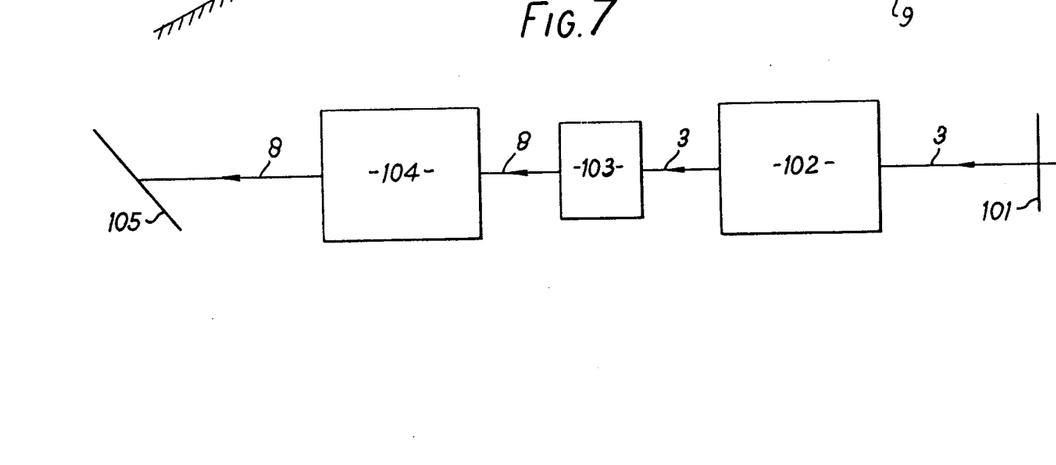
FIG. 7 is a schematic block diagram illustrating, generally, the reversibility of the optical systems of the invention.

In FIG. 7, the line 101 represents an untilted object surface. Light from the object surface enters a first optical imaging system 102 and an image is formed in the region 103. Light is then collected by a second optical imaging system 104.

Mechanical rotation of one imaging system relatively to the other may be used to provide a relative rotation of the optical axes 3 and 8 of the first and second optical imaging systems, respectively, about an axis of rotation in the region 103 and perpendicular to the plane of the figure.

Alternatively, an optical element may be set in the region 103. The optical arrangement may be as described with reference to any of FIGS. 1, 2, 3 or 6.

In any case, the primary image, as seen from the second optical imaging system 104, may have a fixed or an adjustable tilt with respect to the optical axis 8 of the second optical imaging system. The second optical imaging system 104 may be used to relay the primary image onto a target surface 105 which is not orthogonal to the optical axis 8 of the second optical imaging system, but on which the final image is to be in focus.

The arrangement shown in FIG. 7 may be used in a laser beam scanning system, as used in a flight simulation apparatus as described above. In this case, the object surface 101 is a plane in which the scanning device brings the moving beam to a focus, and the target surface 105 is a model terrain.

In the detailed descriptions given above, the radiation passing through the optical systems is assumed to be visible light. Devices according to the invention are not limited to visible light, but may be used in ultra-violet or infra-red radiation systems.

What I claim is:

1. An optical arrangement comprising, in sequence, first and second optical imaging systems respectively positioned between first and second surfaces and said second surface and a third surface, the first and second optical imaging systems respectively defining first and second optical axes and respectively providing first and second images, the second said image being in-focus upon said third surface, said third surface being positioned orthogonal to the second optical axis and in spatially fixed relationship to said first optical imaging system, said optical arrangement further comprising an optical image-tilting device positioned between said first and said second optical imaging systems, and symmetrically distributed about said first image, said first optical imaging system being positioned for imaging said first surface to provide said first image thereof at said second surface, said first and second surfaces being both inclined to said first optical axis, and said second optical imaging system being positioned in relation to said optical image-tilting device for imaging a surface orthogonal to said second optical axis for forming said second image upon said third surface.

2. An optical arrangement as claimed in claim 1, in which said second optical imaging system is positioned with said second optical axis normal to said second surface and intersecting said first optical axis substantially at said second surface and said optical image-tilting device is positioned substantially at said second surface.

3. An optical arrangement as claimed in claim 2, in which said first surface is variably inclined to said first optical axis, said second surface is correspondingly variably inclined to said first optical axis, said second optical axis is fixedly inclined to said first optical axis and said image-tilting device is a mirror rotatable angularly one half said variable inclination of said second surface.

4. An optical arrangement as claimed in claim 3, further comprising a third optical imaging system positioned for imaging a fourth surface image at said first surface.

5. An optical arrangement as claimed in claim 1, in which said first and second optical axes are relatively fixed.

6. An optical arrangement as claimed in claim 5, in which said first surface is variably inclined to said first optical axis, said second surface is variably inclined to said first optical axis and said image-tilting device includes at least one adjustable element.

7. An optical arrangement as claimed in claim 6, in which the image-tilting device is a lens having its axis aligned parallel to said first and second optical axes and displaceable laterally in relation thereto variably according to said variable inclination of said first surface so that said second optical imaging system views said second surface displaced to a position orthogonal to said second optical axis.

8. An optical arrangement as claimed in claim 6, in which the image-tilting device includes a fixed lens, having its axis in fixed alignment with said first and second optical axes, and further includes a pair of mirrors, positioned respectively on said first and second optical axes, and oppositely rotatable to deflect, respectively, said first and second optical axes to intersect in the plane of said lens at a point displaced from said lens axis variably according to said variable inclination of said first surface.

9. An optical arrangement comprising, in sequence, a first surface and first and second optical imaging systems, the first and second optical imaging systems respectively defining first and second optical axis and respectively providing first and second images, said first surface being orthogonal to said first optical axis and said first optical imaging system providing said first image thereof at a second surface also orthogonal to said first optical axis, said second optical imaging system being positioned to provide said second image in-focus upon a third surface inclined to said second optical axis, said optical arrangement further comprising an image-tilting device positioned between said first and second optical imaging systems.

10. An optical arrangement comprising first and second optical imaging systems respectively defining first and second optical axes and respectively positioned between first and second image surfaces and between said second and a third image surfaces, said optical arrangement further comprising an image-tilting device positioned between said first and second optical imaging systems, said first optical imaging system imaging said first surface at said second surface and imaging said second surface at said first surface, said second optical imaging system imaging said second surface at said third surface and imaging said third surface at said second surface, said first and second surfaces being both inclined to the first optical axis, said third surface being orthogonal to said second optical axis and said image-tilting device tilting the second image surface so that the second image surface appears to the second imaging system as being orthogonal to the second optical axis.

* * * * *